United States Patent
Tang

(10) Patent No.: US 8,957,605 B2
(45) Date of Patent: Feb. 17, 2015

(54) LED DRIVING CIRCUIT

(75) Inventor: Xing-Hua Tang, Shenzhen (CN)

(73) Assignee: ScienBiziP Consulting (Shenzhen) Co., Ltd., Guangdong (CN)

( * ) Notice: Subject to any disclaimer, the term of this patent is extended or adjusted under 35 U.S.C. 154(b) by 74 days.

(21) Appl. No.: 13/598,646

(22) Filed: Aug. 30, 2012

(65) Prior Publication Data

US 2013/0271034 A1    Oct. 17, 2013

(30) Foreign Application Priority Data

Apr. 11, 2012    (CN) .......................... 2012 1 0104461

(51) Int. Cl.
*H05B 37/00*    (2006.01)

(52) U.S. Cl.
USPC .......................................... 315/307; 315/297

(58) Field of Classification Search
None
See application file for complete search history.

(56) References Cited

U.S. PATENT DOCUMENTS

| | | | | |
|---|---|---|---|---|
| 3,432,743 A | * | 3/1969 | Ford | 323/279 |
| 4,712,056 A | * | 12/1987 | Schott | 323/315 |
| 5,742,133 A | * | 4/1998 | Wilhelm et al. | 315/291 |
| 2007/0001625 A1 | * | 1/2007 | Kim | 315/312 |

* cited by examiner

*Primary Examiner* — Crystal L Hammond
(74) *Attorney, Agent, or Firm* — Novak Druce Connolly Bove + Quigg LLP

(57) ABSTRACT

A light-emitting diode (LED) driving circuit includes a constant current module, a current follower module and a LED indicator. The constant current module is connected to a power supply output for stabilizing the output current from the power supply at a preset value. The current follower module is connected between the constant current module and the LED indictor for further stabilizing the current output from the constant current module. The LED driving circuit makes sure the current through the LED indicator invariable, thereby keeping brightness of the LED indicator invariable.

7 Claims, 1 Drawing Sheet

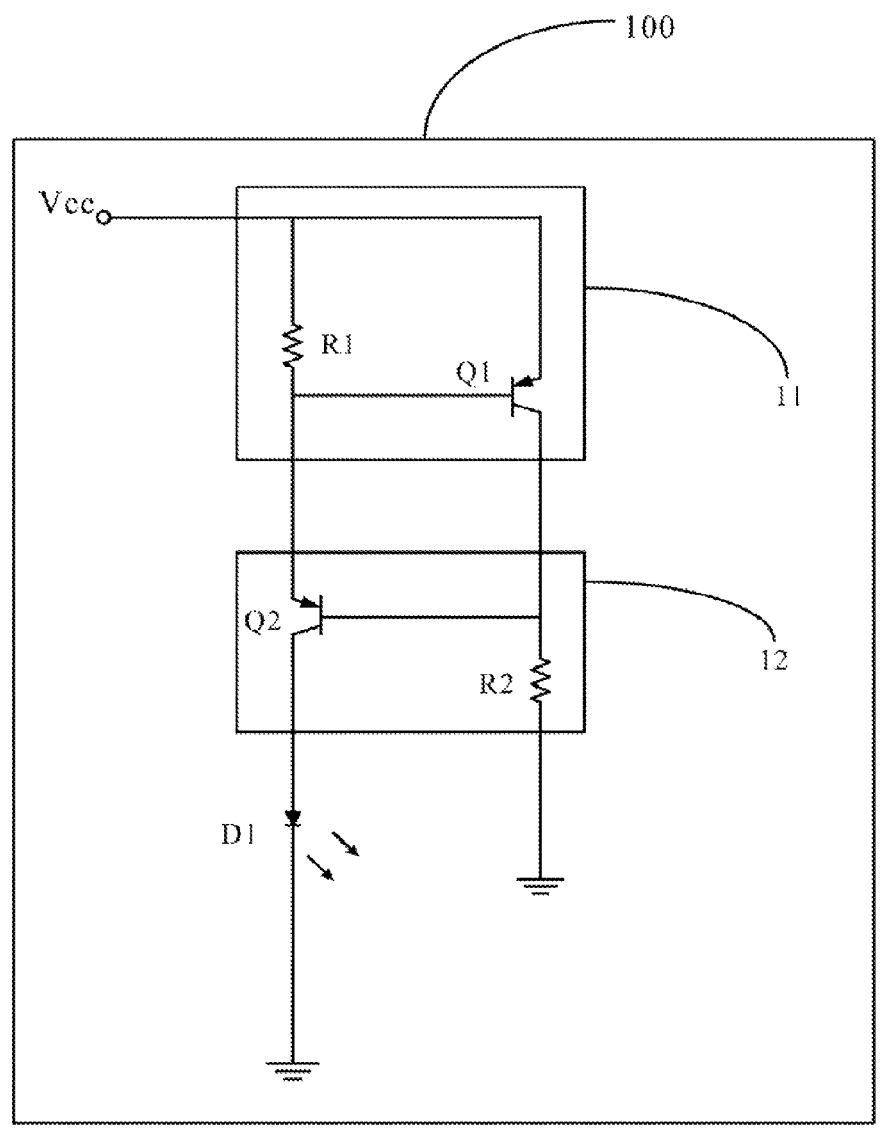

LED DRIVING CIRCUIT

BACKGROUND

1. Technical Field

The present disclosure relates to driving circuits and, particularly, to a light-emitting diode (LED) driving circuit.

2. Description of Related Art

Brightness of an LED changes as the current through the LED varies. A greater current causes the LED to shine brighter. When the driving voltage of the LED changes, the current through the LED changes correspondingly, thereby causing brightness of the LED to change too. In certain circumstances, there is a need for the LED to shine at a constant brightness. Thus, there is a need for a current driving circuit that can resolve the above problem.

BRIEF DESCRIPTION OF THE DRAWING

The components of the drawing are not necessarily drawn to scale, the emphasis instead being placed upon clearly illustrating the principles of the present disclosure. Moreover, in the drawing, like reference numerals designate corresponding parts throughout.

The drawing is a circuit diagram of an LED driving circuit in accordance with an exemplary embodiment.

DETAILED DESCRIPTION

The drawing is a circuit diagram of an LED driving circuit 100 in accordance with an exemplary embodiment. The LED driving circuit 100 includes a constant current module 11, a current follower module 12, and an LED indicator D1. The constant current module 12 is connected to a power supply output $V_{cc}$ for stabilizing the output current from the power supply at a preset value. The current follower module 12 is connected between the constant current module 11 and the LED indictor D1 for further stabilizing the current output from the constant current module 11.

The constant current module 11 includes a current detecting resistor R1 and a first transistor Q1. One end of the current detecting resistor R1 is connected to a base of the first transistor Q1, and the other end is connected to an emitter of the first transistor Q1, namely, the current detecting resistor R1 is connected in parallel with a base-emitter junction of the first transistor Q1. The current follower module 12 includes a second transistor Q2 and a pull-down resistor R2. An emitter of the second transistor Q2 is connected to a base of the first transistor Q1, and a base of the second transistor Q2 is connected to a collector of the first transistor Q1 and connected to ground via the pull-down resistor R2. The positive electrode of the LED indictor D1 is connected to a collector of the second transistor Q2, and the negative electrode of the LED indictor D1 is connected to ground In the embodiment, both the first transistor Q1 and the second transistor Q2 are silicon pnp transistors. In other embodiments, the first transistor Q1 and the second transistor Q2 may be germanium pnp transistors.

To describe the working principal of an embodiment, let current of the LED indicator be represented by $Q_{led}$, and the break-over voltage of the base-emitter junction of the first transistor Q1 represented by $V_{eb}$, then the resistance of the resistor R1 is set to equal $V_{eb}/I_{led}$. The first transistor Q1 and the second transistor Q2 always work in an amplification mode. The voltage of the current detecting resistor R1 is clamped at $V_{eb}$ (the break-over voltage of the emitter junction of the first transistor Q1), thus the current through the current detecting resistor R1 is restricted to $I_{led}$. The base of the second transistor Q2 is connected to ground via the pull-down resistor R2, and the resistance of the pull-down resistor R2 is large. Thus, the current through the base of the second transistor Q2 is very little, and the current through the emitter of the second transistor Q2 is equal to the current through the collector of the second transistor Q2 and is equal to $I_{led}$, thereby keeping brightness of the LED indicator D1 to be substantially invariable.

Although the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. A light emitting diode (LED) driving circuit comprising:
   a constant current module connected to a power supply for stabilizing the current from the power supply;
   an LED indicator; and
   a follower module directly connected to the constant current module and a positive electrode of the LED indicator for further stabilizing the current from the constant current module.

2. The LED driving circuit as described in claim 1, wherein the constant current module comprises:
   a first transistor, an emitter of the first transistor connected to the power supply; and
   a current detecting resistor connected in parallel with a base-emitter junction of the first transistor, one end of the current detecting resistor connected to the power supply and the other end of the current detecting resistor connected to a base of the transistor.

3. The LED driving circuit as described in claim 2, wherein a resistance of the current detecting resistor is set to equal the ratio of a break-over voltage of an base-emitter junction of the first transistor to the current of the LED indicator.

4. The LED driving circuit as described in claim 1, wherein the follower module comprises:
   a second transistor; and
   a pull-down resistor connected between a base of the second transistor and ground.

5. The LED driving circuit as described in claim 4, wherein an emitter of the second transistor is connected to a base of the first transistor, a base of the second transistor is connected to a collector of the first transistor.

6. The LED driving circuit as described in claim 4, wherein the positive electrode of the LED indicator is connected to a collector of the second transistor, and the negative electrode of the LED indicator is connected to ground.

7. The LED driving circuit as described in claim 4, wherein the first transistor and the second transistor are both pnp transistors.

* * * * *